US012096163B2

(12) United States Patent
Alm et al.

(10) Patent No.: US 12,096,163 B2
(45) Date of Patent: Sep. 17, 2024

(54) DEVICE AND A METHOD OF ENCODING IMAGES INCLUDING A PRIVACY FILTER

(71) Applicant: Axis AB, Lund (SE)

(72) Inventors: Carl-Axel Alm, Lund (SE); Stefan Lundberg, Lund (SE)

(73) Assignee: AXIS AB, Lund (SE)

( * ) Notice: Subject to any disclaimer, the term of this patent is extended or adjusted under 35 U.S.C. 154(b) by 279 days.

(21) Appl. No.: 17/528,669

(22) Filed: Nov. 17, 2021

(65) Prior Publication Data
US 2022/0182591 A1   Jun. 9, 2022

(30) Foreign Application Priority Data

Dec. 7, 2020  (EP) ..................................... 20212181

(51) Int. Cl.
*H04N 9/74* (2006.01)
*G06T 5/20* (2006.01)
*G06T 7/10* (2017.01)
*G06T 9/00* (2006.01)
*G06V 10/22* (2022.01)
*G06V 20/52* (2022.01)
(Continued)

(52) U.S. Cl.
CPC ................. *H04N 9/74* (2013.01); *G06T 5/20* (2013.01); *G06T 7/10* (2017.01); *G06T 9/00* (2013.01); *G06V 10/225* (2022.01); *G06V 20/52* (2022.01); *H04N 9/68* (2013.01); *H04N 23/80* (2023.01); *G06T 2207/10016* (2013.01); *G06T 2207/10024* (2013.01); *G06T 2207/30196* (2013.01)

(58) Field of Classification Search
CPC . H04N 9/74; H04N 23/80; H04N 9/68; G06T 7/10; G06T 5/20; G06T 9/00; G06V 10/225

USPC ......................................................... 348/239
See application file for complete search history.

(56) References Cited

U.S. PATENT DOCUMENTS

| | | | |
|---|---|---|---|
| 7,221,794 B1 * | 5/2007 | Gloudemans, II | ........ G06T 7/11 382/176 |
| 2010/0183227 A1 | 7/2010 | Park et al. | |

(Continued)

FOREIGN PATENT DOCUMENTS

EP          3340623 A1     6/2018

OTHER PUBLICATIONS

Extended European Search Report dated Mar. 30, 2021 for European Patent Application No. 20212181.0.
(Continued)

*Primary Examiner* — Joel W Fosselman
(74) *Attorney, Agent, or Firm* — Volpe Koenig (57) ABSTRACT

An image processing device a camera and a method for of encoding images captured by a camera are disclosed. For each image of an image sequence captured by the camera, the image is pre-processed by filtering the image by applying a privacy filter, the privacy filter being configured to distort the image in such a way that privacy is achieved in the filtered image, and, for at least a subset of the filtered images, by colour revising the filtered image by changing colour of pixels of a plurality of scattered areas of the filtered image such that a respective colour of one or more pixels of each area of the plurality of scattered areas represents one or more original colours of one or more pixels before filtering at a location of that area in the filtered image. The pre-processed images are then encoded into an encoded video stream.

15 Claims, 4 Drawing Sheets

(51) Int. Cl.
*H04N 9/68* (2023.01)
*H04N 23/80* (2023.01)

(56) References Cited

U.S. PATENT DOCUMENTS

| | | |
|---|---|---|
| 2011/0274314 A1 | 11/2011 | Yang et al. |
| 2012/0236935 A1* | 9/2012 | Dutt .................... H04N 19/124 |
| | | 375/240.03 |
| 2017/0076572 A1 | 3/2017 | Rao |

OTHER PUBLICATIONS

"Applying Hough Transform for detecting lines in images," http://stella.kojot.co.hu/Delphi/Trukkok/HTML/index.html?line_detect_on_image.htm , Available at: https://web.archive.org/web/20191227183904/http://www.sunshine2k.de/coding/java/Houghtransformation/HoughTransform.html (Dec. 27, 2019).

\* cited by examiner

DEVICE AND A METHOD OF ENCODING IMAGES INCLUDING A PRIVACY FILTER

FIELD OF INVENTION

The present invention relates to encoding images, and specifically to encoding images which are pre-processed by application of a privacy filter.

TECHNICAL BACKGROUND

When using monitoring cameras capturing images which are encoded into a video stream, it may in some scenarios be necessary or at least desirable to apply a privacy filter to the images captured before encoded in order to achieve privacy. Privacy is typically achieved by distortion of the captured images such that facial recognition, identification of registration number of vehicles, etc in relation to the images is prevented.

For example, such a scenario may be that a monitoring camera may not be mounted unless privacy is achieved. Another scenario may be that permission to mount a monitoring camera is not required or is granted faster if privacy can be achieved.

SUMMARY

Facilitating enhanced information extraction from encoded images, which have been pre-processed with a privacy filter before encoding into a video stream, without compromising privacy in the encoded images as such would be beneficial.

According to a first aspect, a method of encoding images captured by a camera is provided. In the method, for each image of an image sequence captured by the camera, the image is pre-processed by filtering the image by applying a privacy filter, the privacy filter being configured to distort the image in such a way that privacy is achieved in the filtered image and, for at least a subset of the filtered images, by colour revising the filtered image by changing colour of pixels of a plurality of scattered areas of the filtered image such that a respective colour of one or more pixels of each area of the plurality of scattered areas represents one or more original colours of one or more pixels before filtering at a location of that area in the filtered image. The pre-processed images are then encoded into an encoded video stream.

By applying a privacy filter in order to distort images in such a way that privacy is achieved and encoding such images into an encoded video stream, the encoded video stream should not be possible to use as such for identifying persons, vehicles etc. Such identification may however be desired if the police are performing an investigation and persons, vehicles etc. relevant to the investigation may be found in the encoded video stream.

There are seemingly contradictory goals to maintain privacy in the encoded video stream and at the same time enable later identification can be removed or at least alleviated by introducing information regarding original colour of pixels in scatter areas of each of the images which have been filtered by application of a privacy filter. By changing colour of pixels of a plurality of scattered areas of each of the filtered image to represent an original colour of the pixels at the location of the respective areas, information regarding original colour can later be extracted for the scattered areas for each image. Hence, over a number of sequential encoded images of the encoded video stream, moving objects such as persons or vehicles etc may be in a position such that a hat, jacket, bike, car etc coincides with one area of the scattered areas in which pixels have been colour revised. Hence, at least an approximate colour of the hat, jacket, bike, car etc can be determined by extracting the colour of the one or more pixels of that area of the plurality of scattered areas. Such colour information will not as such enable identification of a person, vehicle or other. However, it could for example be used by the police in an investigation where persons, vehicles etc. relevant to the investigation may be found in the encoded video stream. For example, the extracted colour of a hat, jacket, bike, car etc can be compared to information from other sources. From such a comparison a person, vehicle or other may be excluded or included in the investigation.

The privacy filter is configured to distort the image in such a way that privacy is achieved in the filtered image. By this is meant that after application of the privacy filter the image is distorted in such a way that identification of a person, such as by recognizing facial features of a person, a registration number of a vehicle or other features that may be tied to a specific individual is prevented. The term privacy filter is intended to cover processing of the image that achieve such prevention. One example of such processing is applying a filter removing details of the image not relating to high gradients in the image, such as a Sobel filter or other filters using a gradient operator. Other examples of such processing are pixelization of all or selected portions of the image e.g., by substantial reduction of the resolution, blurring of all or selected portions of the image, and covering or removing selected objects in the image.

Whilst all images of the image sequence need to be filtered in order to achieve privacy, only a subset of the filtered images need to be colour revised, such as every second image or some other subset of the filtered images need to be colour revised. Naturally, all of the filtered images may be colour revised as well.

By scattered areas is here meant that the areas are separated apart in the image such that there is a distance between neighbouring areas and such that there are areas between the neighbouring areas that are not part of anyone of the scattered areas. By using scattered areas, the information that may be extracted in the form of colours of colour changed pixels representing original colours of pixels of the scattered areas, the risk compromising privacy may be removed or at least reduced.

The plurality of scattered areas may be arranged in a predetermined pattern in the at least a subset of the filtered images. This simplifies identification on a decoder side of the scattered areas comprising pixels that have had their colour changed.

The predetermined pattern may be fixed, i.e., the same, for all filtered images of the at least a subset of the filtered images, i.e., in all colour revised filtered images. In this way the location of the scattered areas can be known on the decoder side without the need for providing metadata between the encoder side and the decoder side indicating a current pattern.

The predetermined pattern may also vary, i.e., be different, between filtered images of the at least a subset of filtered images. In this case, the pattern should preferably vary in a predetermined way such that the location of the scattered areas can be known on the decoder side without the need for providing metadata between the encoder side and the decoder side indicating a current pattern.

The plurality of scattered areas may be arranged in a sparse grid in the at least a subset of the filtered images. This is beneficial since for a moving object captured in the image sequence, it is likely that a portion of the moving object for which the colour may be of interest, is located in at least one of the colour revised filtered images such that at least one of the scattered areas is located on the portion.

The privacy filter may be a privacy filter that comprises applying a gradient operator. Such a gradient operator enables distortion of an image to enhance edges relating to high gradients and reduce details relating to low gradients. Such a privacy filter will enable identification of objects in filtered images but prevents identification of a person, such as by recognizing facial features of a person. The privacy filter may be configured to change the original colours of the images, and specifically be configured to produce monochrome images. Specifically, the privacy filter may be an edge filter such as a Sobel filter.

Each of the respective colours of the one or more pixels of each area of the plurality of scattered areas may represent an original colour of a selected pixel of the one or more pixels before filtering at the location of that area in the filtered image. Hence, the respective colour of one or more pixels may be changed to represent the original colour of one pixel before filtering. Preferably, the colour of two or more pixels of each area of the plurality of scattered areas may be changed to represent an original colour of one pixel before filtering. This is beneficial since having the colour of two or more pixels in each of an area changed to the original colour of the one pixel will reduce the risk that the colour is changed from the encoding of the colour revised filtered image. This is specifically the case if the two or more pixels are neighbouring pixels, such as for example k×k pixels where k is an integer.

The at least one of the respective colours of the one or more pixels of each area of the plurality of areas may represent an average or median of the one or more original colours of the one or more pixels before filtering at the location of that area in the filtered image. Preferably, the respective colour of the one or more pixels of each area of the plurality of areas may represent an average the colours of two or more pixels before filtering at the location of that area in the filtered image. This is beneficial since the average of the original colours of the two or more pixels before filtering may provide a better estimation of a colour of an object or portion of an object in an image on which the scattered area is located than the colour of a single pixel. For example, the image may be subject to noise and if an average of the colours of two or more pixels is used, noise will have a less influence. An average or median of the colours of two or more pixels before filtering may be determined by means of a median filter.

The images of the image sequence may be further pre-processed by applying a low-pass filter to the colour revised filtered images. This is beneficial since the coding cost will then be reduced when encoding the colour revised filtered images.

The method may further comprise, for each image of the image sequence captured by the camera, receiving one or more sub-areas of the filtered image corresponding to objects identified in the image, wherein, for the at least a subset of the filtered images, the plurality of scattered areas is arranged within the received sub-areas of the filtered image. The identified objects in the image may typically correspond to objects for which information in the form of colour may be of interest for extracting at a later stage. Hence, arranging all or at least a majority of the plurality of the scattered areas within the sub-areas of the filtered image corresponding to the object identified in the image will increase the possibility that such information can be extracted.

The images of the image sequence captured by the camera may be further pre-processed by reducing an intensity of the colour changed pixels of the plurality of scattered areas of the colour revised filtered images. By reducing the intensity of the colour changed pixels, the colour changed pixels will be less salient and hence less distracting when viewing a decoded version of the encoded video. This is beneficial since it reduces distraction when the video is viewed for other reasons than extracting the colour information.

According to a second aspect, a non-transitory computer readable storage medium is provided having stored thereon instructions for implementing the method according to the first aspect, when executed on a device having processing capabilities.

The above-mentioned features of the method according to the first aspect, when applicable, apply to this second aspect as well. In order to avoid undue repetition, reference is made to the above.

According to a third aspect, an image processing device is provided. The image processing device comprises circuitry configured to pre-process each image of an image sequence captured by a camera by executing a filtering function and a colour revising function. The filtering function is configured to filter the image by applying a privacy filter, the privacy filter being configured to distort the image in such a way that identification of people in the filtered image is prevented. The colour revising function is configured to, for at least a subset of the filtered images, colour revise the filtered image by changing colour of pixels of a plurality of scattered areas of the filtered image such that a respective colour of one or more pixels of each area of the plurality of scattered areas represents an original colour of one or more pixels before filtering at a location of that area in the filtered image. The image processing device further comprises an encoder configured to encode the pre-processed images into an encoded video stream.

The above-mentioned features of the method according to the first aspect, when applicable, apply to this third aspect as well. In order to avoid undue repetition, reference is made to the above.

According to a fourth aspect, a camera is provided comprising the image processing device according to the third aspect.

A further scope of applicability will become apparent from the detailed description given below. However, it should be understood that the detailed description and specific examples, while indicating preferred embodiments, are given by way of illustration only, since various changes and modifications within the scope of the claims will become apparent to those skilled in the art from this detailed description.

Hence, it is to be understood that is the claims are not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects will now be described in more detail, with reference to appended figures. The figures should not be considered limiting but are instead used for explaining and understanding.

DETAILED DESCRIPTION

The present concepts will now be described hereinafter with reference to the accompanying drawings, in which currently preferred embodiments are illustrated. These concepts may, however, be embodied in many different forms and should not be construed as limited to the embodiments set forth herein.

The concepts set forth herein are applicable in scenarios when privacy is desired or necessary to be achieved in relation to an encoded video stream, i.e., identification of a person, a vehicle or other in the images should not be possible from the encoded video stream by itself. Such privacy may be achieved by distortion of the images, e.g., by application of a privacy filter.

Embodiments of a method 100 of encoding images captured by a camera will now be described with reference to FIG. 1 and with further reference to FIGS. 3A and 3B, and FIG. 4. An image sequence of consisting of n images captured by a camera has been obtained S102 for pre-processing and encoding into an encoded video stream. The camera may for example be a monitoring camera or surveillance camera used to monitor an area. Each image i for i=1→n should then be pre-processed and encoded into the video stream. The variable i is set S106 to 1 and a first image of the image sequence is pre-processed by filtering S110 the first image by applying a privacy filter. The privacy filter is configured to distort the image in such a way that privacy is achieved in the filtered image.

Privacy is achieved if the image is distorted in such a way that identification of a person, such as by recognizing facial features of a person, a registration number of a vehicle or other features that may be tied to a specific individual is prevented. Such distortion may be achieved by applying a filter that removes details of the image not relating to high gradients in the image, such as an edge filter (e.g., a Sobel filter) or any other filter using a gradient operator. Such edge filters are kernel based filters which gives a strong response to rising and falling gradients in all directions. Absolute values of such a gradient operator together with a gain factor can be used to produce a filtered image which includes all edges but omits or reduces all other details of the image. It is possible to edge filter colours of an image but typically edge filtering based on luminance will be sufficient to provide a filtered image in which objects can be identified on a general level, but identification of a specific individual is prevented. Pre-processing an image by applying an edge filter based on luminance will produce a monochrome image. For an example of a filtered image after application of a Sobel filter, reference is made to FIGS. 3A and 3B. In relation to the image of FIGS. 3A and 3B a negative gain factor has been used producing a filtered image where edges are darker and areas without edges are brighter.

Other examples of processing that achieves privacy is pixelization of all of or selected portions of the image e.g., by substantial reduction of the resolution, blurring of all of or selected portions of the image, and covering or removing selected objects in the image. For an example of an image after processing to remove selected objects in the image, reference is made to FIG. 4. In FIG. 4 two objects 410, 420 corresponding to persons have been removed from the image and replaced by a blurred representation of the background. For clarity of illustration, the contours of the two objects 410, 420 have been identified by solid lines in FIG. 4.

Common for the identified examples of processing that achieves privacy is that colours of pixels in the image will be changed by means of the processing in such a way that the colour of pixels after processing may differ considerably from original colours of the pixels before processing. Also, it will not be possible to, from a pixel after processing, identify an original colour of the pixel before processing.

It is then determined C114 if the filtered first image should be colour revised.

Whether or not an image of the image sequence should be colour revised after first being filtered is may be predetermined such that for example all images are colour revised or only a predetermined subset, such as every second, every third etc or some other predetermined subset. In alternative identification, an identification of which images of the image sequence should be colour revised after being filtered may be obtained S104 for the image sequence, such that this can be varied over time, e.g., such that a larger proportion or even all images of the image sequence are colour revised at some times and a smaller proportion of the images of the image sequence are colour revised at other times. This may for example be determined based on identified amount of movement.

In case only a subset of the filtered images should be colour revised, the decoder side needs to in some way decide which of the filtered images have been colour revised in order to avoiding trying to identify colour revised pixels in images of the image sequence which have not been colour revised. The subset is preferably predetermined, such as every second, every third or any other given pattern starting from a given point in time. In this case, the pattern may be synchronised with a group of pictures (GOP) structure of the encoded video stream in order for the decoder side to know which of the filtered images have been colour revised. In case the pattern is not predetermined, metadata indicating for each image whether or not it is colour revised should preferably be provided to the decoder side, e.g., in a side channel.

If the filtered first image should not be colour revised, the first image is encoded into the encoded video stream.

If the filtered first image should be colour revised, the first image is further pre-processed by colour revising S120 the filtered first image by changing colour of pixels of a plurality of scattered areas of the filtered image such that a respective colour of one or more pixels of each area of the plurality of scattered areas represents one or more original colours of one or more pixels before filtering at a location of that area in the filtered image.

The respective colour of the one or more pixels of each area of the plurality of scattered areas representing one or more original colours of one or more pixels before filtering at the location of an area in the filtered image can later be extracted from a decoded image of the encoded video stream. Hence, over a number of sequential encoded images of the encoded video stream, moving objects such as persons or vehicles etc may be in a position such that at least one of the scattered areas in which pixels have been colour revised is located on a hat, jacket, bike, car etc. Hence, at least an approximate colour of the hat, jacket, bike, car etc can be determined by extracting the colour of the one or more pixels of that area of the plurality of scattered areas. Such colour information will not as such enable identification of a person, vehicle or other. However, it could for example be used by the police in an investigation where persons, vehicles etc. relevant to the investigation may be found in the encoded video stream. For example, the extracted colour of a hat, jacket, bike, car etc can be compared to information from other sources. From such a comparison a person, vehicle or other may be excluded or included in the investigation.

The scattered areas are separated apart in the image such that there is a distance between neighbouring areas of the scattered areas, i.e., such that there are areas between neighbouring areas that are not part of anyone of the scattered areas.

The plurality of scattered areas may be arranged in a predetermined pattern in the colour revised filtered images. This simplifies identification on a decoder side of the scattered areas since the predetermined pattern may be known also on the decoder side. Specifically, the scattered areas may be sparse and only relate to one or a few pixels. If the location of each area of the scattered areas is not known on a decoder side where the encoded video stream is decoded and analysed for extraction of the original colour of pixels, identification of pixels for which colour has been changed is possible but may be difficult and time consuming.

The predetermined pattern may be fixed, i.e., such that it is the same for all colour revised filtered images. In this way the location of the scattered areas can be known on the decoder side without the need for providing metadata between the encoder side and the decoder side indicating a current pattern.

Alternatively, the predetermined pattern may vary between filtered images of the at least a subset of filtered images. For a varying pattern, the pattern should preferably vary in a predetermined way such that the location of the scattered areas can be known on the decoder side without the need for providing metadata between the encoder side and the decoder side indicating a current pattern. If the pattern varies in a way that is not predetermined, metadata indicating the current pattern need to be provided to the decoder side.

In alternative to having scattered areas arranged in a predetermined pattern, metadata may be provided to the decoder side indicating the pattern for each colour revised filter image. Such metadata may for example be provided in a side channel.

The plurality of scattered areas is preferably arranged evenly spread out in each image of an image sequence such that, for an object located at an arbitrary location in an image of the image sequence, at least one of the scattered areas is likely to be located on some part of that object. Furthermore, if the object is moving, it is then likely that each portion of the moving object for which the colour may be of interest, in at least one image of the image sequence is located such that at least one of the scattered areas is located on that portion.

Figure 3A:
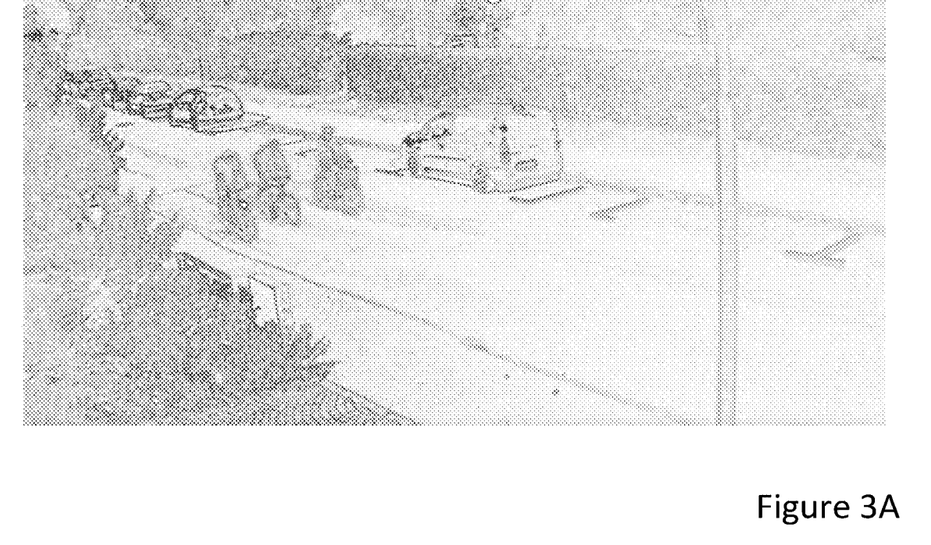
FIG. 3A shows an example of a filtered image in which a Sobel filter has been applied.
Figure 3B:
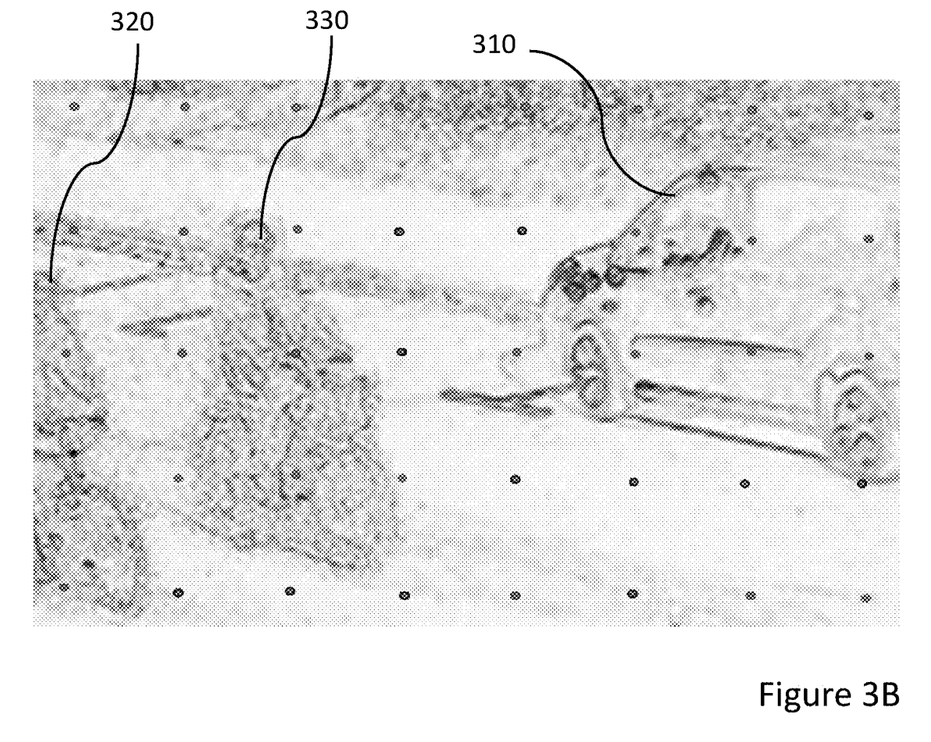
FIG. 3B shows a colour revised version of a portion of the filtered image shown in FIG. 3A.

The plurality of scattered areas may for example be arranged in a sparse grid in the at least a subset of the filtered images such as illustrated in FIG. 3B, which is an enlarged portion of the filtered image in FIG. 3A with included scattered areas having colour revised pixels. In FIG. 3B the scattered areas having colour revised pixels are in the form of circular areas arranged in including eight columns each including five rows. The colour revising is shown by different shading of the circular areas. As can be seen in FIG. 3B, the scattered areas are close enough such that a number of the scattered areas are located on the vehicle 310. Furthermore, even if the scattered areas are not close enough such that at least one of the scattered areas is located on each part of the persons in the image, such as a hat, helmet, jacket, trousers, etc., when the persons 320, 330 move between images of the image sequence, it is likely that at least one of the scattered areas are located on one of these portions in one of the images.

Alternatively, the plurality of scattered areas may be arranged in a pseudorandom pattern. The pseudorandom pattern is preferably predetermined and may be fixed or vary in a predetermined way between images of the image sequence.

The plurality of scattered areas may also be arranged in only a selected portion of each image of the image sequence. For example, the selected portion may relate to a portion of a scene captured in the image sequence which is of interest, such as a road, the entrance to a building etc. It may also be the case that the selected portions relate to areas of the scene captured in the image sequence for which additional information, such as information regarding original colour of pixels, is allowed to be provided in the encoded video stream. The selected portions may for example relate to areas within the premises of a person or organisation that has set up the camera capturing the image sequence, and other portions may relate to prohibited areas of the scene that relate to areas outside those premises for which information regarding original colour of pixels is not allowed to be provided in the encoded video stream.

Each area of the scattered areas is preferably small in relation to the image, such as for example 1 pixel, a square of 3×3 pixels or 5×5 pixels, etc. It may also have the shape of a rectangle, circle or other shape. Even though the size may be larger, it is beneficial if the size of each area is small in relation to the image in order for them not to be distracting to a person viewing the video stream for other reasons than for extracting the original colour information. Furthermore, since the colours of pixels of the scattered areas are changed to represent original colours of pixels in the locations of the scattered areas, the size of each of the scattered areas should not be large enough to compromise privacy.

Each of the respective colours of the one or more pixels of each area of the plurality of scattered areas may represent an original colour of one pixel of the one or more pixels before filtering at the location of that area in the filtered image. For example, if each area of the plurality of scattered areas comprises a plurality of pixels, the respective colour of the plurality of pixels of each area may be changed to represent or be identical to the original colour of one pixel of that area before filtering. The one pixel is preferably be predetermined such that it may be known on the decoder side without the need for providing metadata, e.g., in a side channel, to the decoders side indicating which pixel in the image had the original colour. To change the colour of a plurality of pixels in each area to the original colour of the selected pixel is beneficial since it will reduce the distortion of the colour from the encoding of the colour revised filtered image.

As an example, each area of the scattered areas may comprise a square of 3×3 pixels. Each of the respective colours of the 3×3 pixels of each area of the plurality of scattered areas may then be changed to the original colour of one of the pixels of the 3×3 pixels. The one of the pixels may for example be the centre pixel. Other examples are possible such as a square of 5×5 pixels, a circular shape of pixels, a rectangular shape of pixels etc.

Furthermore, the at least one of the respective colours of the one or more pixels of each area of the plurality of areas may represent an average or median of the one or more original colours of the one or more pixels before filtering at the location of that area in the filtered image. For example, if each area of the scattered areas comprises a plurality of pixels, the respective colours of one or more of the pixels of each area of the plurality of areas may represent an average the colours of the plurality of pixels before filtering at the location of that area in the filtered image. This is beneficial since the average of the original colours of the plurality of pixels may provide a better estimation of a colour of an object or portion of an object in an image on which the scattered area is located than the colour of a single pixel. For example, the image may be subject to noise and if an average of the colours of two or more pixels is used, noise will have a less influence. An average or median of the colours of two or more pixels before filtering may be determined by means of a median filter applied to the plurality of pixels.

As an example, each area of the scattered areas may comprise a square of 3×3 pixels. One or more of the respective colours of the 3×3 pixels of each area of the plurality of scattered areas may then be changed to an average or median of the original colours of the pixels of the 3×3 pixels. Other examples are possible such as a square of 5×5 pixels, a circular shape of pixels, a rectangular shape of pixels etc.

The pre-processed first image is then encoded S130 into an encoded video stream.

The variable i is then incremented i=i+1 and it is checked C134 if i>n. If it is not, the method is repeated from for the next image i from pre-processing the next image by filtering S110 the next image. In this case i=2 and n>1, hence the method is repeated by pre-processing the second image i=2 of the image sequence by applying the privacy filter.

Once the check C134 indicates that i>n, this means that all n images of the image sequence have already been pre-processed and encoded into the video stream, and hence the method ends.

The images of the image sequence captured by the camera may be further pre-processed by reducing S122 an intensity of the colour changed pixels of the plurality of scattered areas of the colour revised filtered images. By reducing the intensity of the colour changed pixels, the colour changed pixels will be less salient and hence less distracting when a decoded version of the encoded video is viewed by a person for other reasons than extracting the original colour information of pixels. The colour gain can for example be reduced from normal 100% to 30%. The amount of reduction may be predetermined such that it is known on the decoder side such that the reduction is compensated for if the images should be used for extracting information regarding original colour of pixels. In alternative, metadata indicating the amount of reduction can be provided to the decoder side, e.g., in a side channel.

The images of the images sequence may be further pre-processed by applying S124 a low-pass filter to the colour revised filtered images. By applying the low-pass filter to the colour revised filtered images the colour information is "smeared" out to neighbouring pixels such that the colour gradient is reduced. Hence, some of the additional coding cost due to the high frequency changes due to the added original colour pixels can be avoided.

In some scenarios, sub-areas of the filtered images may have been identified representing objects in each image of the image sequence. This may for example have been made based on an object tracking algorithm to track objects in the image sequence. The information relating to the identified sub-areas may be used to filter the image by adding an opaque block covering the sub-areas in each image of the image sequence or it may be used to remove the objects from each image of the image sequence. An example of the latter is shown in FIG. 4 in which sub-areas 410, 420 corresponding to two persons have been identified and been removed from a filtered image and replaced by a blurred indication of the background behind each of the two persons. The method 100 may then further comprise, for each image of the image sequence captured by the camera, receiving S112 one or more sub-areas of the filtered image corresponding to objects identified in the image. For each of the filtered images, the plurality of scattered areas may then be arranged within the received sub-areas of the filtered image. One example of this is such as illustrated in FIG. 4 in which it can be seen that all of the scattered areas illustrated as small circles 412, 414 within the sub-area 410 to the left and similar circles within the sub-area 420 to the right. The identified sub-areas in a filtered image may typically correspond to objects for which information in the form of colour may be of interest for extracting at a later stage. Hence, arranging all or at least a majority of the plurality of the scattered areas within the sub-areas of the filtered image corresponding to the object identified in the image will increase the possibility that such information can be extracted.

Since the sub-areas corresponding to identified objects will typically vary between images of the image sequence in a way that is not predetermined, the pattern of the scattered areas will also vary in a way that is not predetermined. Hence, metadata indicating the current pattern will need to be provided, e.g., via a side channel, to the decoder side for the decoder side to easily identify the location of pixels having their colour changed to represent an original colour before filtering.

Figure 4:
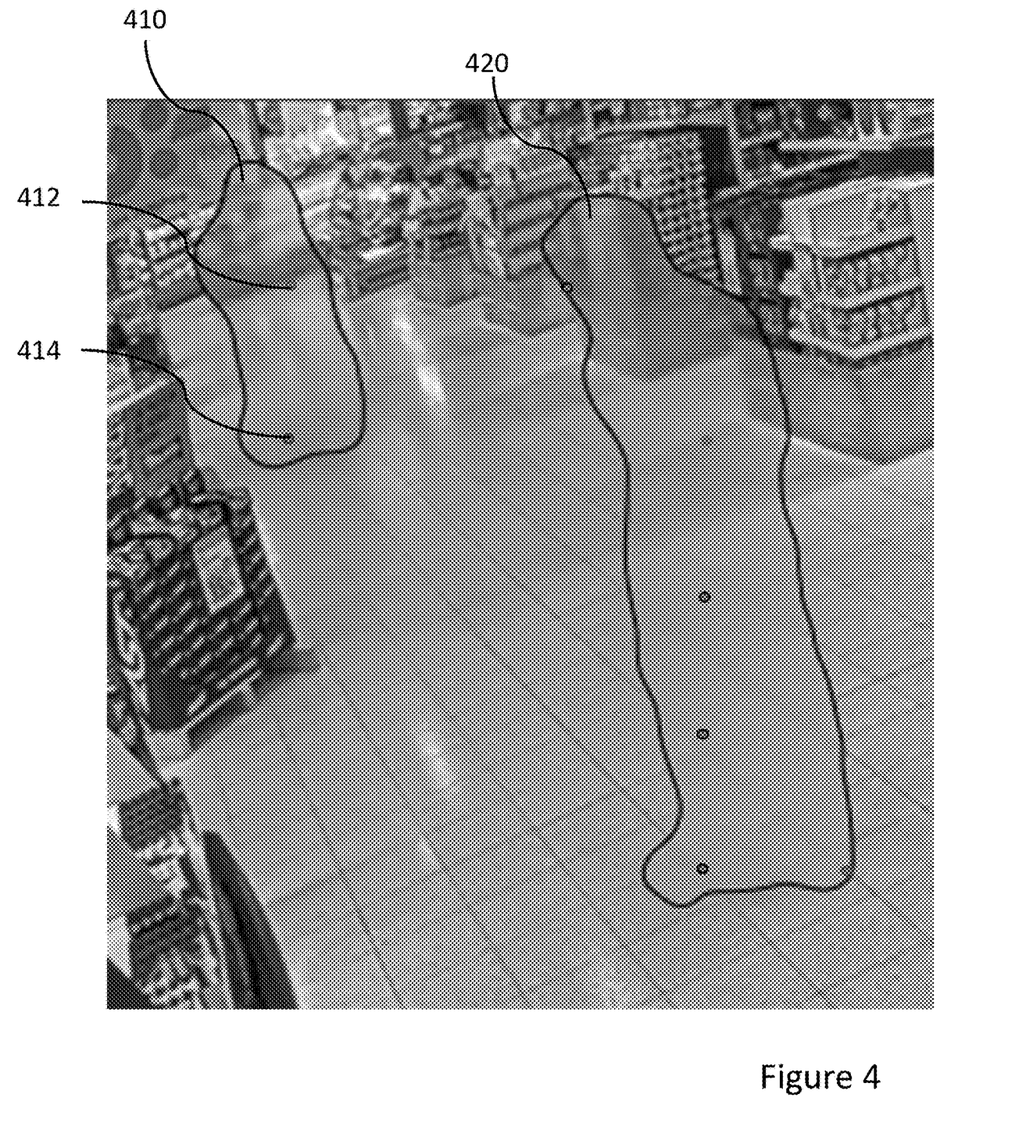
FIG. 4 shows a colour revised version of a further filtered image in which individuals have been identified and removed.

As can be seen in FIG. 4, the scattered areas 412, 414 of the sub-area 410 to the left and the corresponding scattered areas of the sub-area 420 to the right are a subset of a plurality of scattered areas in a general pattern in the form of a sparse grid similar to the sparse grid illustrated in FIG. 3B. The subset of the plurality of scattered areas are the scattered areas which are within the sub-area 410 and sub-area 420, respectively. Hence, the metadata provided to the decoder side could be metadata identifying the sub-areas 410, 420. If the general pattern in the form of the sparse grid is predetermined, the scattered areas within the sub-areas 410, 420 can be determined on the decoder side based on the predetermined pattern and the received metadata identifying the sub-areas 410, 420.

It is to be noted, that even if the method 100 has been described in relation to pre-processing and encoding the n images of the image sequence from a first image, i.e., image 1, to the last image, i.e., image n, the images do not have to be pre-processed in the order of the sequence of images, i.e., an order in which they were captured by the camera. They may be pre-processed in any order and then encoded into the video stream such that the video stream includes the encoded pre-processed images in an order corresponding to the order in which the images of the image sequence were captured by the camera.

It should further be noted that the sizes of the scattered areas in FIG. 3B and in FIG. 4 are only for purpose of illustration. The actual sizes of the scattered areas may be considerably smaller.

Figure 2:
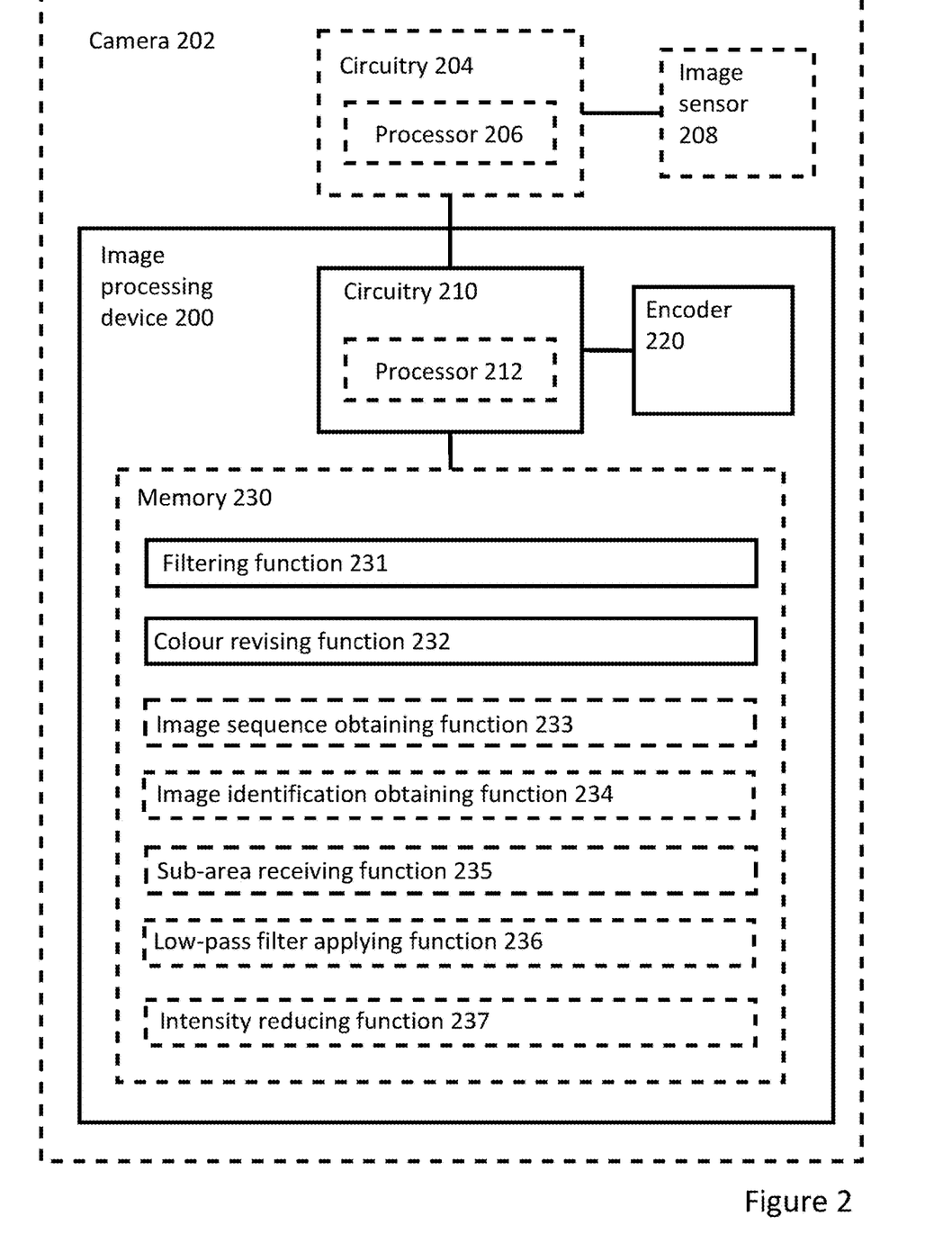
FIG. 2 is a schematic diagram in relation to embodiments of an image processing device and embodiments of a camera of the present disclosure.

FIG. 2 is a schematic diagram in relation to embodiments of an image processing device 200 and embodiments of a camera 202 comprising an image sensor 208 configured to capture images of an image sequence. Image sensors and capturing of images are well known for the person skilled in the art and will not be discussed in any more detail in this disclosure. The camera 202 may be a monitoring camera or surveillance camera. The camera 202 may be a separate unit or it may be integrated in another unit, such as in a helmet, glasses etc. The camera 202 may be used for capturing video in relation to monitoring an area without a specific need of identifying persons, vehicles or other in the video. However, captured data may subsequently be used as evidence, for example when investigating crimes and prosecuting persons suspected for the crimes. In order to preserve the captured data, a data management system external from the camera 202, such as a video management system or an evidence management system, may be used. Such data management systems generally provide storage of captured data, and also viewing of the captured data, either in real time or as a playback of recorded data.

The image processing device 200 comprises an encoder 220, and circuitry 210.

The encoder 220 is configured to encode images, e.g., images of an image sequence, captured by the image sensor 208 of the camera 202, into a video stream. The video stream provided by the encoder 220 may be referred to as an encoded video stream.

The circuitry 210 is configured to carry out functions of the image processing device 200. The circuitry 210 may include a processor 212, such as a central processing unit (CPU), microcontroller, or microprocessor. The processor 212 is configured to execute program code. The program code may for example be configured to carry out the functions of the image processing device 200.

The image processing device 200 may further comprise a memory 230. The memory 230 may be one or more of a buffer, a flash memory, a hard drive, a removable media, a volatile memory, a non-volatile memory, a random access memory (RAM), or another suitable device. In a typical arrangement, the memory 230 may include a non-volatile memory for long term data storage and a volatile memory that functions as system memory for the circuitry 210. The memory 230 may exchange data with the camera circuitry 210 over a data bus. Accompanying control lines and an address bus between the memory 230 and the circuitry 210 also may be present.

Functions of the image processing device 200 may be embodied in the form of executable logic routines (e.g., lines of code, software programs, etc.) that are stored on a non-transitory computer readable medium (e.g., the memory 230) of the image processing device 200 and are executed by the circuitry 210 (e.g., using the processor 212). Furthermore, the functions of the image processing device 200 may be a stand-alone software application or form a part of a software application that carries out additional tasks related to the image processing device 200. The described functions may be considered a method that a processing unit, e.g., the processor 212 of the circuitry 210 is configured to carry out. Also, while the described functions may be implemented in software, such functionality may as well be carried out via dedicated hardware or firmware, or some combination of hardware, firmware and/or software.

The circuitry 210 is configured to pre-process images of the image sequence by executing a filtering function 231 and a colour revising function 232. The filtering function 231 is configured to filter the image by applying a privacy filter, the privacy filter being configured to distort the image in such a way that identification of people in the filtered image is prevented. The colour revising function 232 is configured to, for at least a subset of the filtered images, colour revise the filtered image by changing colour of pixels of a plurality of scattered areas of the filtered image such that a respective colour of one or more pixels of each area of the plurality of scattered areas represents an original colour of one or more pixels before filtering at a location of that area in the filtered image.

The camera 202 may further comprise a local data storage (not shown) configured to store the video stream and/or a transmitter (not shown) configured to transmit, e.g., wirelessly, the video stream, e.g., to continuously transfer the captured video stream to a remote site.

The circuitry 210 may be further configured to execute an image sequence obtaining function 233. The image sequence obtaining function 233 is configured to obtain images of an images sequence captured by the camera 202.

The circuitry 210 may be further configured to execute an image identification obtaining function 234. The image identification obtaining function 234 is configured to obtain an identification of which images of the image sequence should be colour revised after being filtered.

The circuitry 210 may be further configured to execute a sub-area receiving function 235. The sub-area receiving function 235 is configured to, for each image of the image sequence captured by the camera, receiving one or more sub-areas of the filtered image corresponding to objects identified in the image, wherein, for the at least a subset of the filtered images, the plurality of scattered areas is arranged within the received sub-areas of the filtered image.

The circuitry 210 may be further configured to execute a low-pass filter applying function 236. The low-pass filter applying function 236 is configured to further pre-process each image of the image sequence by applying a low-pass filter to the colour revised filtered images.

The circuitry 210 may be further configured to execute an intensity reducing function 237. The intensity reducing function 237 is configured to further pre-process each image of the image sequence by reducing an intensity of the colour changed pixels of the plurality of scattered areas of the colour revised filtered images.

Figure 1:
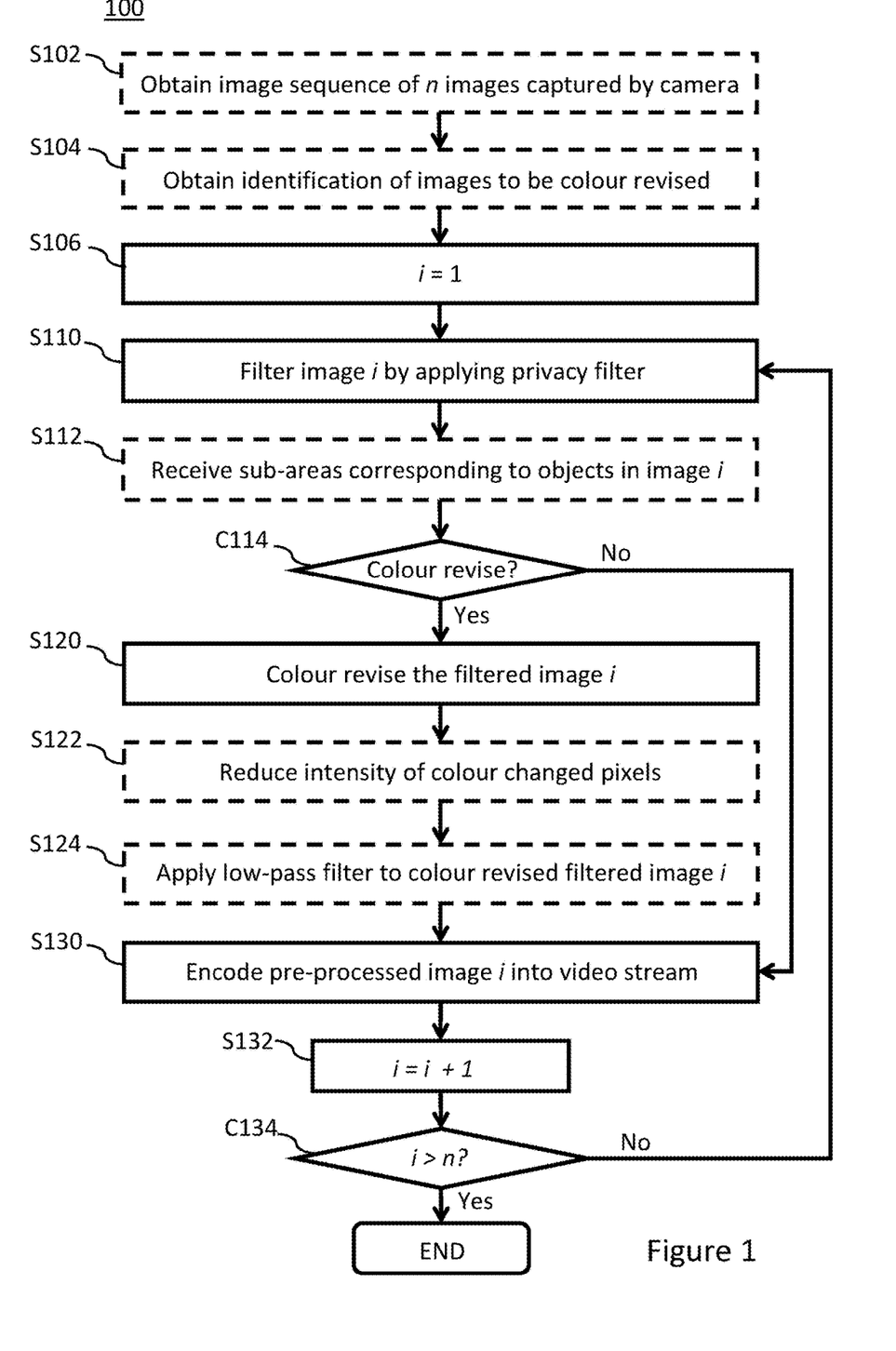
FIG. 1 is a flow chart in relation to embodiments of a method of the present disclosure.

The functions carried out by the encoder 220 and the circuitry 210 may be further adapted as the corresponding steps of the method 100 described in relation to FIG. 1.

A person skilled in the art realizes that the present invention is not limited to the embodiments described above. On the contrary, many modifications and variations are possible within the scope of the appended claims. Such modifications and variations can be understood and effected by a skilled person in practicing the claimed invention, from a study of the drawings, the disclosure, and the appended claims.

The invention claimed is:

1. A method of encoding images captured by a camera, the method comprising:
   for each image of an image sequence captured by the camera, pre-processing the image:
      by filtering the image by applying a privacy filter, the privacy filter being configured to distort the image in such a way that identification of a person in the filtered image is prevented, wherein colours of pixels in the image are changed from their original colours by applying the privacy filter, and
      for each image of at least a subset of images that have been filtered by applying the privacy filter, by colour revising the image by changing colours of one or more pixels of each area of a plurality of scattered areas of the image to colours representing original colours of the one or more pixels before the privacy filter was applied to the image; and
   encoding the pre-processed images into an encoded video stream.

2. The method of claim 1, wherein the plurality of scattered areas is arranged in a predetermined pattern in the at least a subset of the filtered images.

3. The method of claim 2, wherein the predetermined pattern is fixed for all filtered images of the at least a subset of the filtered images.

4. The method of claim 2, wherein the predetermined pattern varies between filtered images of the at least a subset of the filtered images.

5. The method of claim 1, wherein the plurality of scattered areas is arranged in a sparse grid in the at least a subset of the filtered images.

6. The method of claim 1, wherein applying a privacy filter comprises applying a gradient operator.

7. The method of claim 1, wherein the privacy filter is configured to produce monochrome images.

8. The method of claim 1, wherein the privacy filter is an edge filter.

9. The method of claim 1, wherein each of the respective colours of the one or more pixels of each area of the plurality of scattered areas represents an original colour of a selected pixel of the one or more pixels before filtering at the location of that area in the filtered image.

10. The method of claim 1, wherein at least one of the respective colours of the one or more pixels of each area of the plurality of areas represents an average of the one or more original colours of the one or more pixels before filtering at the location of that area in the filtered image.

11. The method of claim 1, further comprising, for each image of the image sequence captured by the camera:
   receiving one or more sub-areas of the filtered image corresponding to objects identified in the image,
   wherein, for the at least a subset of the filtered images, the plurality of scattered areas is arranged within the received sub-areas of the filtered image.

12. The method of claim 1, wherein the images of the image sequence captured by the camera are further pre-processed by:
   reducing an intensity of the colour changed pixels of the plurality of scattered areas of the colour revised filtered images.

13. A non-transitory computer readable storage medium having stored thereon instructions for implementing a method of encoding images captured by a camera, when executed on a device having processing capabilities, the method comprising:
   for each image of an image sequence captured by the camera, pre-processing the image:
      by filtering the image by applying a privacy filter, the privacy filter being configured to distort the image in such a way that identification of a person in the filtered image is prevented, wherein colours of pixels in the image are changed from their original colours by applying the privacy filter, and
      for each image of at least a subset of images that have been filtered by applying the privacy filter, by colour revising the image by changing colours of one or more pixels of each area of a plurality of scattered areas of the image to colours representing original colours of the one or more pixels before the privacy filter was applied to the image; and
   encoding the pre-processed images into an encoded video stream.

14. An image processing device comprising:
   circuitry configured to pre-process each image of an image sequence captured by a camera by executing:
      a filtering function configured to filter the image by applying a privacy filter, the privacy filter being configured to distort the image in such a way that identification of a person in the filtered image is prevented, wherein colours of pixels in the image are changed from their original colours by applying the privacy filter, and
      a colour revising function configured to, for each image of at least a subset of images that have been filtered by applying the privacy filter, colour revise the image by changing colours of one or more pixels of each area of a plurality of scattered areas of the image to colours representing original colours of the one or more pixels before the privacy filter was applied to the image; and
      an encoder configured to encode the pre-processed images into an encoded video stream.

15. A camera comprising the image processing device comprising:
   circuitry configured to pre-process each image of an image sequence captured by a camera by executing:
      a filtering function configured to filter the image by applying a privacy filter, the privacy filter being configured to distort the image in such a way that identification of a person in the filtered image is prevented, wherein colours of pixels in the image are changed from their original colours by applying the privacy filter, and
      a colour revising function configured to, for each image of at least a subset of images that have been filtered by applying the privacy filter, colour revise the image by changing colours of one or more pixels of each area of a plurality of scattered areas of the image to colours representing original colours of the one or more pixels before the privacy filter was applied to the image; and
      an encoder configured to encode the pre-processed images into an encoded video stream.

* * * * *